R. J. STOKES.
FLEXIBLE DISK COUPLING.
APPLICATION FILED MAY 24, 1919.

1,398,163.

Patented Nov. 22, 1921.

Inventor:
Robert J. Stokes
by his Attorneys

UNITED STATES PATENT OFFICE.

ROBERT J. STOKES, OF TRENTON, NEW JERSEY, ASSIGNOR TO THERMOID RUBBER COMPANY, OF HAMILTON TOWNSHIP, NEW JERSEY, A CORPORATION OF NEW JERSEY.

FLEXIBLE DISK-COUPLING.

1,398,163.  Specification of Letters Patent.  Patented Nov. 22, 1921.

Application filed May 24, 1919. Serial No. 299,531.

*To all whom it may concern:*

Be it known that I, ROBERT J. STOKES, a citizen of the United States, and a resident of Trenton, county of Mercer, State of New Jersey, have invented certain Improvements in Flexible Disk-Couplings, of which the following is a specification.

My invention relates to certain improvements in flexible couplings of the type in which a series of flexible disks are located between the two spiders, one spider being mounted on a driven shaft and the other spider being mounted on the driving shaft.

The object of my invention is to provide a coupling in which the disks are made of canvas, or other fabric, and rubber, the arrangement being such that the strains to which the coupling is subjected will be evenly distributed throughout the several disks, making a substantial coupling and one which will withstand the shocks and strains placed upon a coupling of this type, especially in automobile driving gears.

Figure 1:
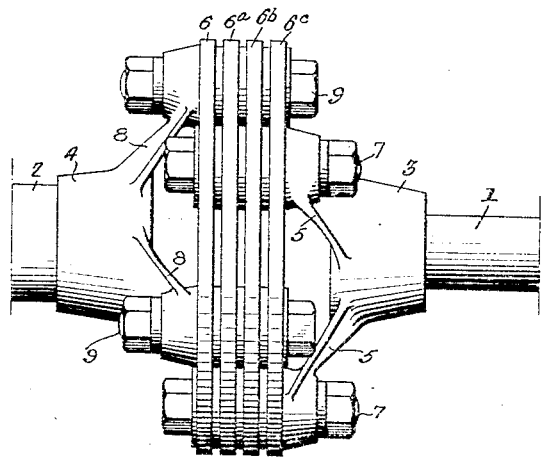
Figure 1 is a side view of a coupling illustrating my invention.
Figure 2:
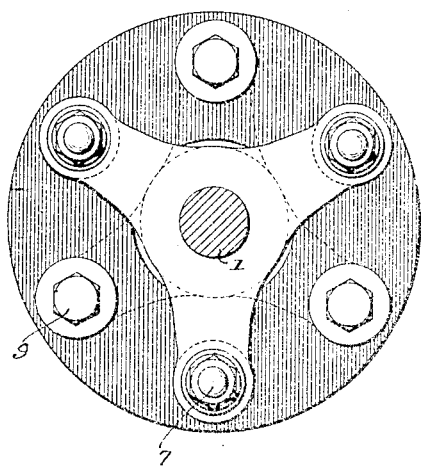
Fig. 2 is an end view.

1 is a driving shaft. 2 is a driven shaft. 3 is a spider secured to the driving shaft and 4 is a spider secured to the driven shaft. The spider 3 has three arms 5, in the present instance, which are secured to the disks 6, 6ª, 6ᵇ, and 6ᶜ by bolts 7. 8 are three arms on the spider 4 secured to said disks by bolts 9. The arms of the spider 4 alternate with the arms of the spider 3, as clearly shown in Fig. 2.

Heretofore, it has been the general practice to make these disks of leather, but lately they have been made of a composition of canvas and rubber. There are usually several layers of canvas, which have been impregnated with rubber, pressed, and vulcanized into a solid disk.

In a patent granted to E. J. Hardy, No. 1,172,988, dated February 26, 1916, is shown, described and claimed the idea of making a solid disk of a plurality of separate layers of fabric secured together with the warp threads of one layer at an angle to the warp threads of another layer, or layers. This is a practical way of making a very substantial disk, although it is costly and wasteful and must be made by an expert.

I find that I can obtain very good results by making each disk of a plurality of layers of fabric having their warp threads running in the same direction, vulcanizing the fabric, and then cutting the disk from the strip of fabric, thus avoiding considerable waste. I then assemble the disk in such manner that the warps of one disk (which are heavier than the wefts) are arranged at an angle to those of the other disks.

Figure 3:
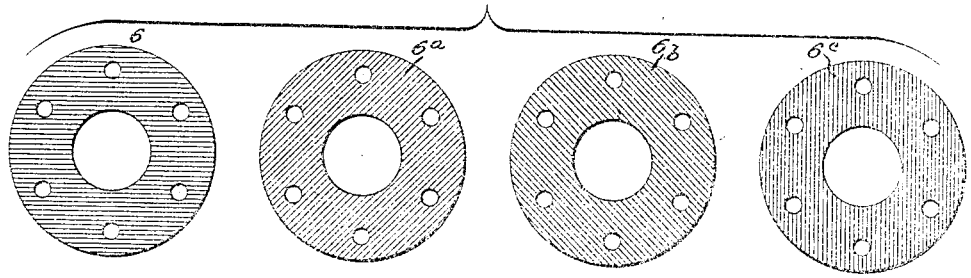
Fig. 3 is a view showing the several disks detached and arranged side by side.

For instance, in Fig. 3, I have shown the four disks 6, 6ª, 6ᵇ, and 6ᶜ separated and lined to indicate the direction of the warps. These disks are all punched from the same sheet of fabric and by turning them so that the warps of the disk 6ª will be at an angle of 45 degrees to the warps of the disk 6 and the warps of the disk 6ᵇ will be at right angles to the warps of the disk 6ª and the warps of the disk 6ᶜ will be at right angles to the warps of the disk 6, then the warps will be so distributed that the driving strain will fall evenly on the entire series of disks, making a substantial coupling.

While I have shown a coupling made of four disks, it will be understood that my invention can be applied to a two-disk coupling. In this event, the warps of one disk will be arranged at an angle to those of the other disk, preferably at right angles.

When a coupling is made of three disks, then the disks are so arranged that the warps of one disk will be at an angle to those of the other two disks, and if a coupling have more than four disks, then the disks will be arranged so that no two disks will have the warps running in the same direction.

I claim:

1. The combination in a flexible coupling, of a driving and a driven shaft; a spider mounted on each shaft; and a series of disks secured to each spider, each disk being composed of a plurality of layers of fabric having their warp threads running in the same direction, the disks being so arranged that the warp threads of one disk will be at a predetermined angle to those of the other section.

2. The combination in a flexible coupling, of a driving and a driven shaft; a spider mounted on each shaft; and a series of four disks clamped to the arms of both spiders, each disk being composed of a plurality of layers of fabric having their warp threads running in the same direction, the disks being so arranged that the warp threads of the several disks are spaced at 45 degrees apart so that the strains to which the coupling is subjected will be evenly distributed through the four disks.

ROBERT J. STOKES.